Aug. 31, 1965  D. E. DYKAAR  3,204,245
DATA PROCESSING APPARATUS
Filed March 6, 1961  3 Sheets-Sheet 1
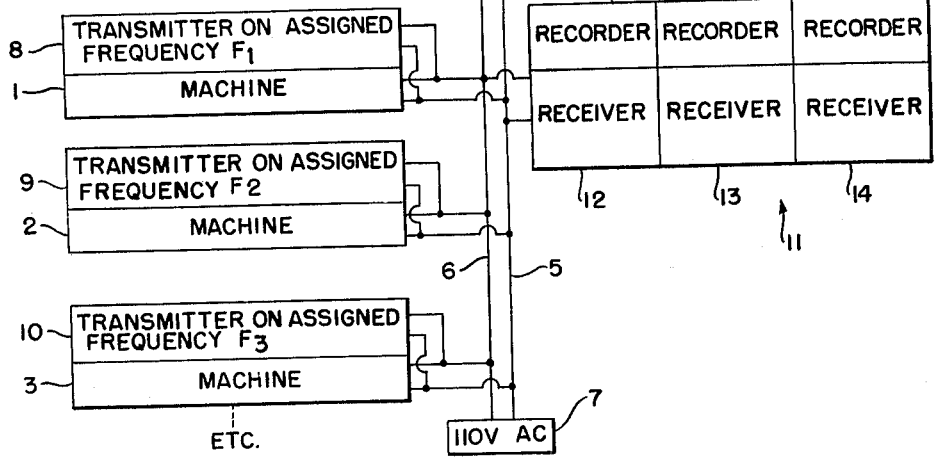
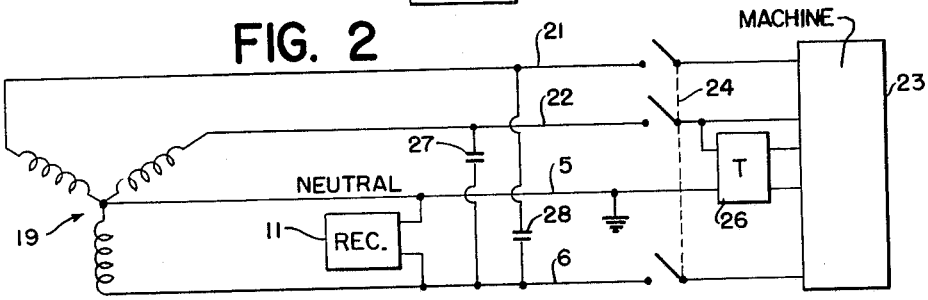
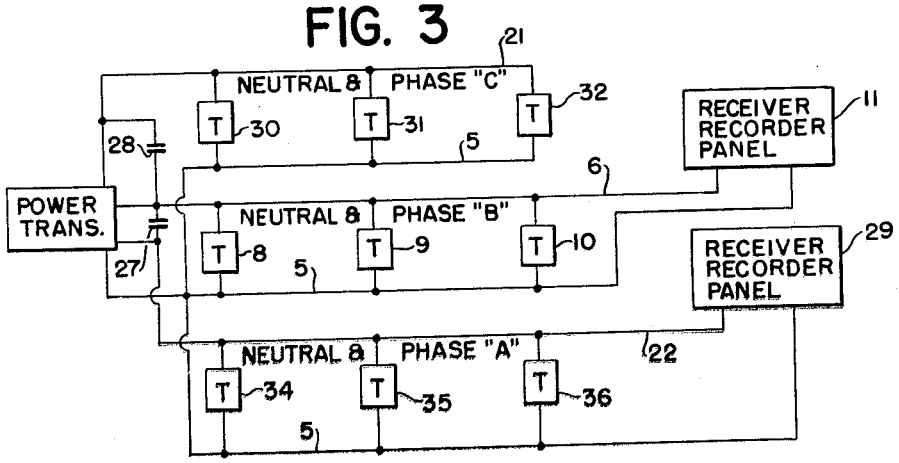
INVENTOR.
DAVID E. DYKAAR
BY  MARCH AND CURTISS
ATTORNEYS Aug. 31, 1965   D. E. DYKAAR   3,204,245
DATA PROCESSING APPARATUS
Filed March 6, 1961   3 Sheets-Sheet 2
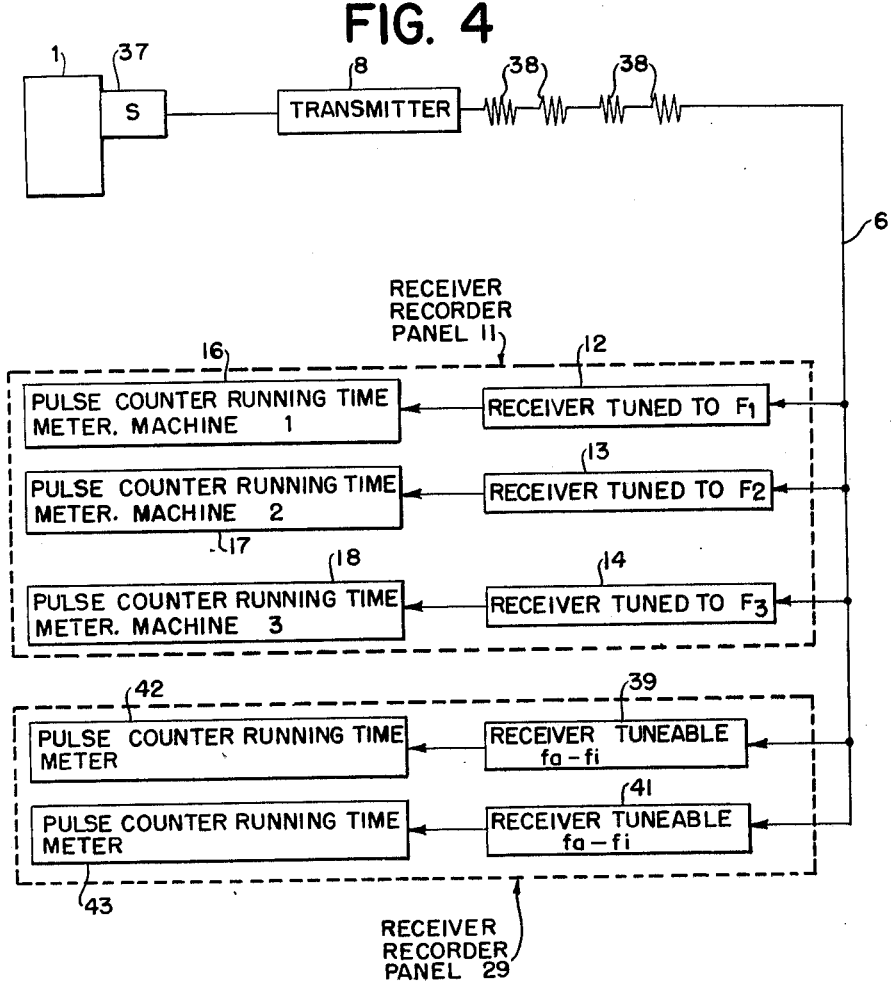
INVENTOR.
DAVID E. DYKAAR
BY
March and Curtiss
ATTORNEYS Aug. 31, 1965    D. E. DYKAAR    3,204,245
DATA PROCESSING APPARATUS
Filed March 6, 1961    3 Sheets-Sheet 3

INVENTOR.
DAVID E. DYKAAR
BY
March and Curtiss
ATTORNEYS

United States Patent Office 3,204,245
Patented Aug. 31, 1965

3,204,245
DATA PROCESSING APPARATUS
David E. Dykaar, 212—23 16th Ave., Bayside 60, N.Y.
Filed Mar. 6, 1961, Ser. No. 94,119
1 Claim. (Cl. 346—33)

This invention relates to simplified means for producing and processing data from electrically driven machines in order to obtain a record of or to control the integrated operation of such machines.

One of the principal problems of modern mass production factories using electrically driven machines is in the integration of a group of machines into an organized production facility, so that the correct number of individual components will be produced at the correct time to combine with other components in order to form a complete assembly. For example, in the production of an automotive engine, it is necessary that pistons be made at the rate of a certain number per minute, so as to be available for assembly with a corresponding number of piston rods and with the proper number of engine blocks to avoid, on the one hand, having an excessive number of pistons or, on the other hand, holding up the assembly of complete engines because of a scarcity of pistons. The same problem arises endlessly, even in the manufacture of less complicated devices than automobile engines, and in all fields it is further aggravated by the necessity of changing production rates from time to time because of changes in sales rates.

Written time records of the individual machinists are too slow to be satisfactory, particularly as the automatic interrelation of various machines is increased, and it is, therefore, one of the principal objects of the present invention to provide means for obtaining at a central office substantially instantaneous information as to the actual production of separate parts by separate machines within a factory or manufacturing establishment.

A further object is to produce data suitable for further operation and management control of production rates so as to obtain smooth flow of parts in an over-all manufacturing process.

A still further object is to obtain and transmit instantaneously a measurement of parts while being produced, in order to check the production efficiency or to correlate the parts thus produced with other parts manufactured in a different area but designed for subsequent combination in a complete assembly.

Further objects will be apparent from the following written description, together with the drawings, in which:

FIG. 1 is a simplified block diagram of a data processing system according to the invention;

FIG. 2 shows one form of power line connection for the data processing system of FIG. 1;

FIG. 3 is a more complete data processing system;

FIG. 4 shows a more exact block diagram of one section of the data processing system of FIG. 3;

Figure 5:
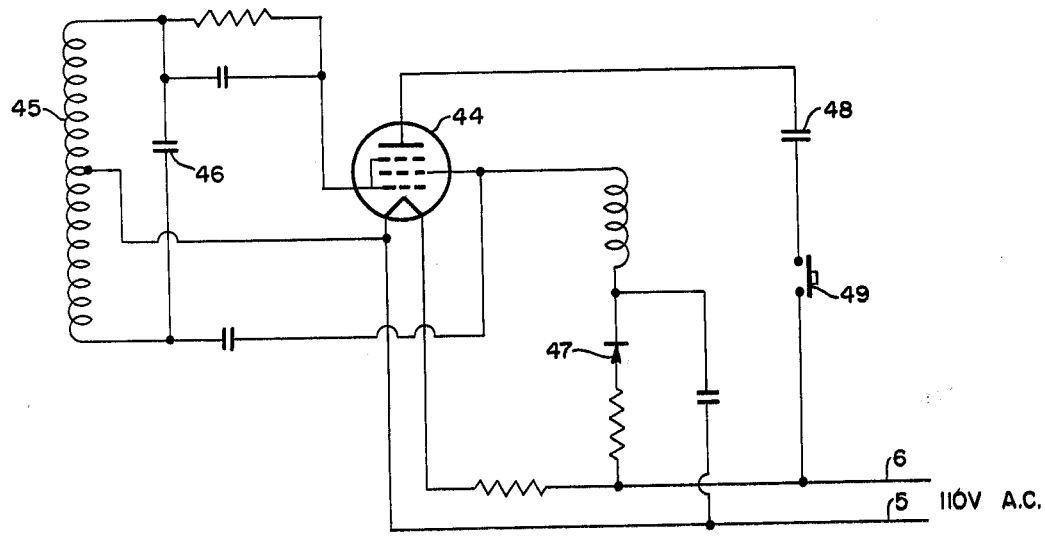
FIG. 5 is a schematic diagram of a data transmitter suitable for use in the system of FIG. 1.

In accordance with the invention, the power lines through which electrical current is transmitted to drive the various machines are used also as data transmission lines. The units of data are generated at each machine by means of electrical sensor apparatus, which may measure any desired characteristic of the part being machined. The electrical signal generated by the sensor is then used to control the oscillations of an electrical oscillation generator, and these controlled oscillations, or electrical data, are then transmitted along the power lines from the machine to a central headquarters where receivers are connected to the power transmission lines to transfer the electrical data from the transmission lines to suitable data receiving units. In the event that the power transmission lines which operate the machines do not go to the same central data receiving point, but instead go to a power sub-station from which such lines branch off to different groups of machines, the invention includes high-frequency transfer circuits to transfer the high-frequency oscillations on which data has been coded, so that data from the entire manufacturing establishment may be transmitted to the central receiving location.

In FIG. 1 only three machines 1, 2, and 3 are indicated although there would normally be many more. These machines may be lathes or drill presses or any other types of machines that might be used in a production facility, and each is electrically operated by current from a common power line consisting of a neutral or grounded common line 5 and another line 6 which is sometimes referred to as a phase line or a hot line. Each of the machines includes an electrical data transmitter closely associated with, or even mounted on, the machine and operating on an assigned frequency which not only is different from the frequency of the other transmitters but is considerably higher than the frequency of the alternating current power supply 7. The transmitter 8 associated with machine 1 operates on a frequency $F_1$, the transmitter 9 associated with machine 2 operates on a frequency $F_2$, and the transmitter 10 associated with machine 3 operates on a frequency $F_3$. Each of these transmitters is directly connected to the power lines 5 and 6, both to receive energizing current therefrom and to supply high-frequency signals thereto. A data recording panel 11 is also connected to the same pair of lines 5 and 6 and includes separate receivers 12, 13, and 14 tuned to receive frequencies $F_1$, $F_2$, and $F_3$ respectively. A separate recorder 16, 17 and 18 is connected respectively to each of the receivers to make a record of information derived by the receivers from the power lines.

While the lines 5 and 6 in FIG. 1 are indicated as a simple pair of lines, it is well-known that in establishments at which relatively high-powered electrical machinery is operated, multi-phase power lines are used.

FIG. 2 shows the lines 5 and 6 connected as part of a 3-phase system. As in FIG. 1, line 5 remains the neutral line and line 6 is one of the phase lines connected a a Y-connected secondary 19 of a 3-phase power transformer. The other two phase lines are indicated by reference characters 21 and 22. Such a power line may be used as a 3-phase system by connecting machines to the three lines 6, 21 and 22 or it may be used in effect as three single phase systems by connecting some of the machines between lines 6 and 5 and others between lines 21 and 5 and still others between lines 22 and 5.

FIG. 2 also shows a machine 23 similar to the machine 1–3 of FIG. 1 connected to the 3-phase lines 6, 21 and 22 by means of a multiple switch 24 to operate with 3-phase power. A transmitter 26 is connected between the grounded neutral line 5 and one of the phase lines 22 between the switch 24 and the machine 23 so that the transmitter 26 will operate only when the machine 23 operates. The data recording panel 11, which is similar to that shown in FIG. 1, is connected between the lines 5 and 6 and means must therefore be provided to connect the high-frequency signals from the transmitter 26 to the data control panel 11. This is accomplished by means of two relatively low-capacitance condensers 27 and 28 which are connected respectively between the phase lines 6 and 22 and 21 and 22. The 3-phase lines are therefore effectively short circuited together for high-frequency currents but the impedance of the two condensers 27 and 28 is so small that they have a negligible effect on the low-frequency power current. High frequency current is connected directly from the line 22 to the line 6 through the medium of the condenser 27 and thus signals from the transmitter 26 may be applied to the data recording panel 11.

FIG. 3 shows a more complete arrangement of a large number of transmitters such as might be found in a complete machine shop. It is understood that each of the transmitters is connected to a machine, to derive information therefrom by means of sensing devices and to transform that information into electrical data. While normally there would be at least one transmitter for each machine, it is quite possible that there may be more than one transmitter for a given machine in order to transmit different types of data.

Two receiver recording panels 11 and 29 are indicated. Panel 11, as in FIGS. 1 and 2, is connected between lines 5 and 6, while panel 29 is connected between lines 5 and 22. Because of the interconnection of the three lines 6, 21 and 22 through capacitors 27 and 28, the two recording panels 11 and 29 may each receive simultaneously information concerning all of the machines as transmitted on the signal frequencies, provided at least one receiver in panel 11 and one in panel 29 are tuned to the proper frequency. Alternatively, certain of the information may be recorded on the panel 11, while other information from other machines may be recorded on panel 29. Receiver 11 is not limited to only that information concerning the machines 8, 9, and 10 connected between the same power lines 5 and 6 but can also record information from the transmitters 30–32 connected between the lines 5 and 21, as well as information from transmitters 34–36 connected to lines 5 and 22.

The electrical data to be transmitted may be generated by varying certain signal characteristics of the electrical oscillations generated by the transmitters. For counting and recording purposes, the oscillations may be divided up into pulsed groups and information may be encoded by variations of the pulse periodicities, pulse widths, pulse carrier frequencies, amplitude modulation of the carrier frequency, or any combination of these four characteristics. In addition, the existence or non-existence of pulses can be used to indicate whether the machine is being operated or not. The characteristics to be measured may include any desired physical dimensional measurements of the part being measured, or the cutting rate of tools or other factors decided upon in advance.

Whatever the desired characteristics, they may be measured by an electrical transducer, or sensor. Consider a system in which it is desired to record the running time of machines and the number of items produced by each machine. Such a sensor 37 is shown attached to the machine 1 in FIG. 4. The output of this sensor is connected to the transmitter 8, which generates a series of pulses 38 of oscillations having a basic frequency which is different for each machine. These pulses 38 are connected to the phase line 6, it being understood that at all times the neutral line 5 is also being used, although it is not shown in this simplified diagram. Panel 11 records information on the recording meters 16, 17 and 18 in accordance with information encoded on the pulses from transmitter 8 and the other transmitters, which are not shown in this figure.

In addition, it is sometimes desirable to be able to check more or less briefly on certain of the machines without maintaining a steady recording of signals therefrom. This may be done by the second receiver recording panel 29 which is provided with two tuneable receivers 39 and 41. Each of these latter receivers is tuneable over the whole band, or spectrum of frequencies generated by all of the transmitters in the shop, and each of the tuneable receivers is connected to a recording meter. The meter 42 records the output of the receiver 39 and the meter 43 records the output of the receiver 41. These recordings, however, have meaning only insofar as they can be correlated with the frequencies to which the receivers 39 and 41 are tuned during the time that any portion of the recording is made. In general, the recordings of the meters 42 and 43 would be used only for short term checks of the operation of certain machines in the shop and the recordings made by the meters 16–18 of panel 11 would be used for overall production control.

FIG. 5 shows a simplified form of transmitter which may be used as the transmitter 8, for example, of FIG. 1. This transmitter comprises an oscillator tube 44 which generates oscillations, the frequency of which is controlled primarily by a tank circuit consisting of a coil 45 and a condenser 46. Alternating current is derived from the power lines 5 and 6 and rectified by a circuit including a rectifier 47. The high-frequency oscillations generated by the oscillator are connected back to the line 6 through a condenser 48 and sensor switch 49.

Figure 6:
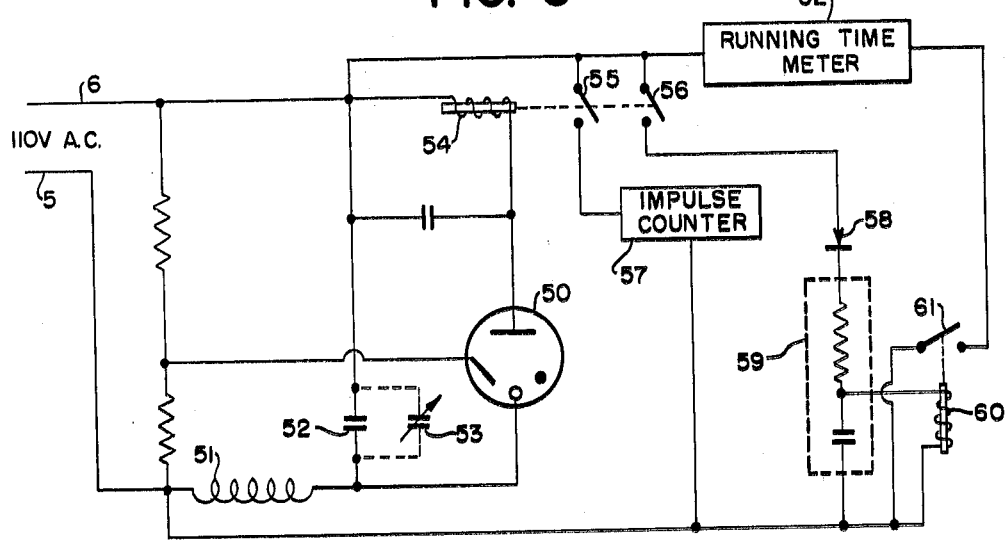
FIG. 6 is a schematic diagram of a data receiver suitable for operation with the transmitter of FIG. 5.

FIG. 6 shows a simplified receiver which may function as the receiver 12 of FIG. 1. This receiver includes a gas filled triode tube 50 which conducts when high frequency signals of a sufficient voltage level are received at its anode from the power lines 5 and 6. The receiver is tuned to a frequency determined by a coil 51 and a pair of condensers 52 and 53 connected in parallel. Condenser 52 is the main tuning condenser and condenser 53 is a small, variable condenser used to adjust the tuning of the receiver.

When an impulse is received by the receiver and detected by the tube 50, it energizes a relay 54 which closes the contacts 55 and 56 of the relay and energizes an impulse counter 57 as well as a detecting circuit comprising a diode 58 and a resistance- capacitance smoothing circuit 59. The latter circuit is connected to a second relay 60 which, when energized, closes a pair of contacts 61 to start a running time meter 62 which continues to run so long as the contacts 61 are closed.

While this invention has been described in specific terms, it will be understood by those skilled in the art that modification will be made within the scope of the following claim.

What is claimed is:

Processing apparatus comprising a plurality of electrically operated machines; a common electrical power source supplying power at a relatively low frequency; power lines connecting said source to all of said machines to supply power therefor; at least one sensor connected to each of said machines to be controlled by the operation thereof; a separate transmitter connected to said power lines to derive operating power therefrom and connected to each of said sensors, respectively, to be controlled only by the respective sensor to produce a relatively high frequency electrical signal in accordance with the operation of the respective one of said machines, each of said transmitters producing an electrical signal of a different frequency from that produced by any of the other of said transmitters; a connection from each of said transmitters to said power lines to supply transmitter signals thereto; and recording means connected to said power lines to derive operating power therefrom and to receive simultaneously all of said transmitter signals from said lines and to record, simultaneously and independently, each of said signals.

References Cited by the Examiner
UNITED STATES PATENTS

| | | | |
|---|---|---|---|
| 2,319,633 | 5/43 | Roseby et al. | 340—310 |
| 2,515,968 | 7/50 | Shanklin | 340—167 |
| 2,547,025 | 4/51 | Noble | 340—171 |
| 2,751,578 | 6/56 | Johannesson | 340—213 |
| 2,942,112 | 6/60 | Hearn | 340—147 X |
| 2,962,702 | 11/60 | Derr et al. | 346—33 |
| 3,034,100 | 5/62 | Brixner | 340—182 X |

NEIL C. READ, *Primary Examiner.*

BENNETT G. MILLER, *Examiner.*